US008654235B2

(12) United States Patent
Im et al.

(10) Patent No.: US 8,654,235 B2
(45) Date of Patent: Feb. 18, 2014

(54) APPARATUS AND METHOD FOR DISPLAYING SERVICE INFORMATION PROVIDED IN SERVICE ZONE

(75) Inventors: Jinsung Im, Seoul (KR); Yunji Koh, Seoul (KR); Kangsoo Shin, Seoul (KR); Dukho Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 476 days.

(21) Appl. No.: 13/054,616

(22) PCT Filed: Aug. 13, 2010

(86) PCT No.: PCT/KR2010/005348
§ 371 (c)(1),
(2), (4) Date: Jan. 18, 2011

(87) PCT Pub. No.: WO2012/020867
PCT Pub. Date: Feb. 16, 2012

(65) Prior Publication Data
US 2012/0038781 A1 Feb. 16, 2012

(51) Int. Cl.
*H04N 5/222* (2006.01)
*G09G 5/00* (2006.01)
(52) U.S. Cl.
USPC ..................... 348/333.01; 345/632

(58) Field of Classification Search
USPC ............... 348/231.99, 231.3, 333.01, 333.02; 345/632, 633
See application file for complete search history.

(56) References Cited

U.S. PATENT DOCUMENTS

| 8,180,396 B2* | 5/2012 | Athsani et al. ................ 455/557 |
| 8,416,309 B2* | 4/2013 | Yoshimaru et al. ...... 348/211.99 |
| 2010/0321540 A1 | 12/2010 | Woo et al. |

FOREIGN PATENT DOCUMENTS

| KR | 10-2005-0078136 A | 8/2005 |
| KR | 10-0912264 B1 | 8/2009 |
| KR | 10-2009-0104068 A | 10/2009 |
| KR | 10-2009-0106069 A | 10/2009 |

* cited by examiner

*Primary Examiner* — Timothy J Henn
(74) *Attorney, Agent, or Firm* — Birch, Stewart, Kolasch & Birch, LLP

(57) ABSTRACT

A terminal device includes: a camera configured to capture an image via a lens; a wireless communication unit configured to receive service information corresponding to a service zone in the service zone; a controller configured to extract service information corresponding to the image captured by the camera among the received service information; and a display unit configured to visually display the extracted service information under the control of the controller.

15 Claims, 7 Drawing Sheets

APPARATUS AND METHOD FOR DISPLAYING SERVICE INFORMATION PROVIDED IN SERVICE ZONE

TECHNICAL FIELD

The present invention relates to an apparatus and method for displaying service information and, more particularly, to an apparatus and method for displaying service information provided in a particular service zone.

BACKGROUND ART

In general, when a service provided in a particular area is used, a user searches for his desired service among numerous services provided in a certain area and uses it. In particular, even when the certain area is an area in which the user has used a service or an area that the user has frequently visited, the user must directly search for his desired service information among numerous types of service information provided by the corresponding area. Thus, the use of service takes much time and is cumbersome in terms of user convenience.

DISCLOSURE OF THE INVENTION

Therefore, an object of the present invention is to extract customized service information from service information provided in a particular service zone and display it.

To achieve these and other advantages and in accordance with the purpose of the present invention, as embodied and broadly described herein, there is provided a terminal device including: a camera configured to capture an image via a lens; a wireless communication unit configured to receive service information corresponding to a service zone in the service zone; a controller configured to extract service information corresponding to the image captured by the camera among the received service information; and a display unit configured to visually display the extracted service information under the control of the controller.

The terminal device may further include: a storage unit, wherein the storage unit comprises map information representing a place in which the received service information is used, and the map information is pre-stored in the storage unit or received from a server in the service zone.

The map information comprises at least one of a location, an image, a direction, a distance, an altitude and an identification code of the place.

The controller extracts the service information corresponding to the captured image by using at least one of a location, a direction, a distance and an altitude of the camera when the image is captured.

The controller extracts the service information corresponding to the captured image by using an image or an identification code of the captured image. The controller controls the wireless communication unit to transmit the captured image to a server in the service zone when the image is captured, and extracts the service information corresponding to the captured image by using the location information of the captured image received from the server.

The controller controls the display unit to display the extracted service information on the captured image in an overlapped manner.

The controller extracts customized service information of the service information corresponding to the captured image, and controls the display unit to display the extracted customized service information on the captured image in an overlapped manner.

The customized service information may be detailed service information which is pre-stored or received from a server in the service zone.

The service zone is an area in which the terminal device can access a server managed in a predetermined area, and the server stores service information and location information of the service information specialized at the predetermined area and provides the stored information to terminals connected to the server.

The detailed service information is at least one of recommendation information, coupon information, advertisement information, and usage status information.

When one of the detailed service information is selected by a user request, the controller controls the wireless communication unit to transmit the selected detailed service information.

When one of the detailed service information is selected by a user request, the controller controls the storage unit to store the selected detailed service information.

The controller controls the display unit to disappear the customized service information when a pre-set time lapses.

The controller controls the display unit to display the extracted service information and customized service information of the extracted service information correspondingly according to a movement of the image.

The controller controls the display unit to separately display the extracted service information and other service information on a main screen and an ambient screen.

To achieve the above objects, there is also provided a server including: a reception unit configured to receive image information captured by a camera included by a terminal; a storage unit configured to store service information corresponding to a service zone and detailed service information regarding the service information; an information extracting unit configured to extract service information corresponding to the received image information among the stored service information; and a transmission unit configured to transmit the extracted service information to the terminal.

The storage unit comprises map information representing a place in which the stored service information is used.

The map information comprises at least one of a location, an image, a direction, a distance, an altitude and an identification code of the place.

The information extracting unit may extract service information corresponding to the received image information based on the map information.

The server may further include: a calculation unit configured to extract the detailed service information from the storage unit and calculate a position of the extracted detailed service information to be displayed on the image captured by the camera.

According to exemplary embodiments of the present invention, because service information provided in a particular service zone and customized service information of the service information are extracted by using image information illuminated by a camera and the location information of a terminal and displayed, thus increasing user convenience.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incor- In the drawings.

MODES FOR CARRYING OUT THE PREFERRED EMBODIMENTS

Figure 1:
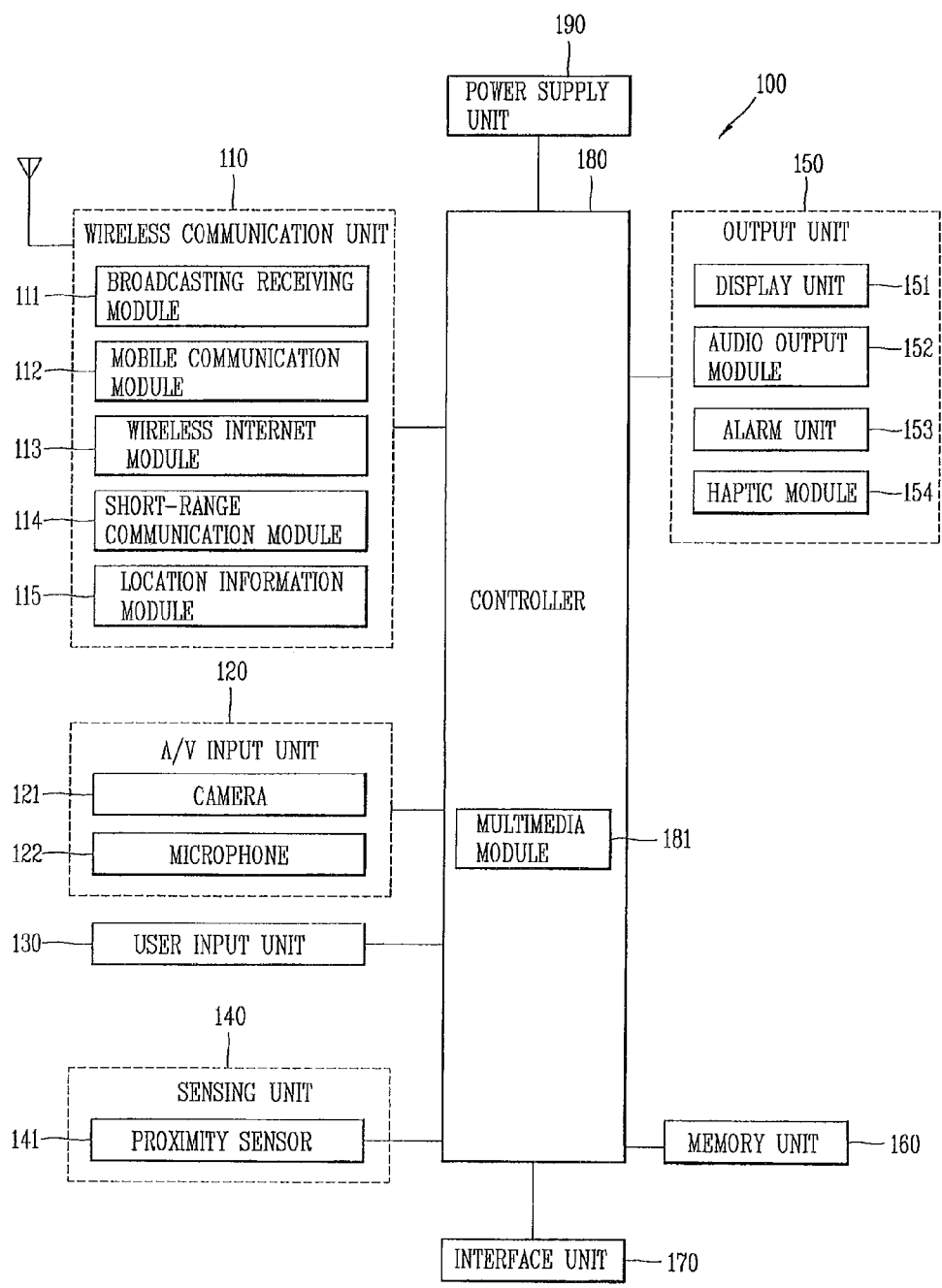
FIG. 1 is a schematic block diagram of a mobile terminal according to an exemplary embodiment of the present invention.

Reference will now be made in detail to the preferred embodiments of the present invention, examples of which are illustrated in the accompanying drawings.

A mobile terminal according to exemplary embodiments of the present invention will now be described with reference to the accompanying drawings. In the following description, usage of suffixes such as 'module', 'part' or 'unit' used for referring to elements is given merely to facilitate explanation of the present disclosure, without having any significant meaning by itself. In describing the present disclosure, if a detailed explanation for a related known function or construction is considered to unnecessarily divert the gist of the present disclosure, such explanation has been omitted but would be understood by those skilled in the art.

The like elements are given the like reference numerals, regardless of reference numerals, and repeated description thereof will be omitted.

The mobile terminal associated with the present disclosure may include mobile phones, smart phones, notebook computers, digital broadcast receivers, PDAs (Personal Digital Assistants), PMPs (Portable Multimedia Player), navigation devices, and the like.

It would be understood by a person in the art that the configuration according to the embodiments of the present disclosure can be also applicable to the fixed types of terminals such as digital TVs, desk top computers, or the like, except for any elements especially configured for a mobile purpose.

FIG. 1 is a schematic block diagram of a mobile terminal according to an embodiment of the present disclosure.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, and the like. FIG. 1 shows the mobile terminal as having various components, but it should be understood that implementing all of the illustrated components is not a requirement. Greater or fewer components may alternatively be implemented.

Also, the mobile terminal 100 includes a location information generation unit.

The location information generation unit generates location information regarding an area that a portion of the terminal points to by using the location and movement of the terminal. Here, the location of the terminal may be measured by a GPS receiver, and the movement of the terminal may be measured by using at least one of a geomagnetic sensor, a gyro sensor, and an acceleration sensor.

The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or anther type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth, Radio Frequency IDentification (RFID), Infrared Data Association (IrDA), Ultra-WideBand (UWB), ZigBee, and the like.

The location information module 115 is a module for checking or acquiring a location (or position) of the mobile terminal. A typical example of the location information module is a GPS (Global Positioning System).

With reference to FIG. 1, the A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate input data from commands entered by a user to control various operations of the mobile terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. The sensing unit may include an acceleration sensor, a geomagnetic sensor, a gyro sensor, and the like. The acceleration sensor measures a change in the location of the mobile terminal by calculating the movement of the terminal. The geomagnetic sensor senses the magnetism of the earth and informs about an azimuth angle, whereby the direction of the terminal is measured. The geomagnetic sensor provides an elaborate location-based service by combining location data and azimuth angle data received from a GPS, as well as indicating an electronic compass and an azimuth angle indication.

For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units (or other display means) according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

With reference to FIG. 1, a proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152. The display unit 151 and the audio output module 152 may be classified as a part of the alarm unit 153.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various types of information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied there through to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. In particular, when the mobile terminal enters a service zone, the controller compares location information of service information received from the service zone and that of service information corresponding to an image captured by the camera. Upon comparison, if the location information of each service information of the captured image is identical to the location information of the received service information, the controller extracts customized service information regarding each service information of the captured image. The controller may provide control to map the extracted customized service information to corresponding service information and display the same. In the above, the service zone refers to a service area in which the mobile terminal can be connected with a server managed in the service area through a wireless communication scheme. The server stores service information specialized in the service area and provides the stored service information to terminals connected to the server. In particular, the wireless communication scheme uses a Wi-Fi method, and the mobile terminal is connected to the server through an access point.

Also, after the mobile terminal enters the service zone, the controller compares location information of the service information from received the service zone and that of the service information corresponding to an area that a portion of the terminal points to. Upon comparison, the controller extracts service information whose location information is identical to each service information within the area that a portion of the terminal points to, or customized service information of the service information and display the same.

For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Exemplary embodiments of the present invention related to a control method that can be implemented in the terminal configured as described above will now be described in detail. The exemplary embodiments described hereinafter may be used along or may be combined to be used. The exemplary embodiments described hereinafter may be combined with the foregoing user interface so as to be used.

Figure 2:
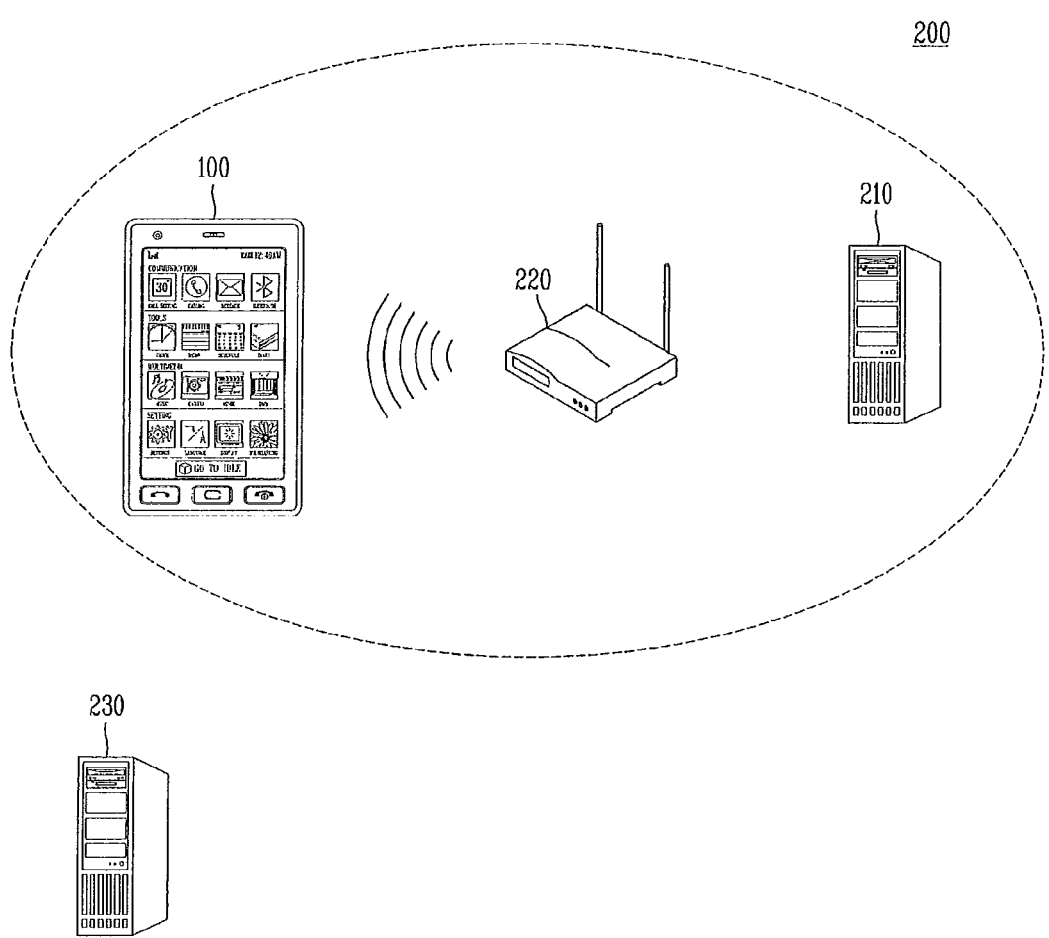
FIG. 2 is a conceptual view of providing a zone casting service according to an exemplary embodiment of the present invention.

FIG. 2 is a conceptual view of providing a zone casting service according to an exemplary embodiment of the present invention.

A zone casting service refers to a service that can receive service information from a specialized service zone by executing an application program related to the specialized service zone when the user enters the specialized service zone. The service information is received from a server managed in the service zone, and the mobile terminal is connected to the server through wireless access communication. In particular, the user may use the service information provided in the service zone free of charge through a communication scheme based on Wi-Fi, without using a mobile communication network.

A system 200 providing the zone casting service may include the terminal 100, a local server 210, an access point 220, and an external server 230.

First, the terminal 100 detects that it has entered a specialized service zone. Here, the specialized service zone refers to an area in which the terminal 100 can access the local server 210 administered or managed in the service zone through a Wi-Fi wireless communication scheme. In the specialized service zone, the service information stored in the local server is provided to terminals connected to the local server.

When the terminal detects that it has entered the service zone, the terminal may inform the user accordingly in various manners. For example, the terminal informs the user that the terminal is located in the specialized service area by using a SMS, a voice message, a vibration function, or by providing a screen fitting the service zone.

When request information of the user is input in order to receive the specialized service information, the terminal searches access points provided in the service zone and is connected to the local server of the service zone by using one of the searched access points. After being connected to the local server, the terminal receives the service information stored in the local server. Here, the method of inputting the user's request information may be a process selecting an application for accessing the specified service zone. The application is an application program that can be used anywhere in the specialized service zone.

Also, the terminal includes a location information generation unit in order to perform the functions (to be described hereinafter). The location information generation unit generates location information regarding an area that a portion of the terminal points to by using the location and movement of the terminal. Here, the location of the terminal is measured by using a GPS receiver, and the movement of the terminal may be measured by using one or more of a geomagnetic sensor, a gyro sensor, and an acceleration sensor.

The local server 210 is a server operated in a specialized service zone. The local server 210 stores customized contents specialized for each of particular service zones, and provides the stored service information to terminals connected to the local server.

The local server makes service information provided in the service zone database according to the characteristics or positions of the service information. Here, the information DB stored in the local server may be service information provided in a building or a particular area including the local server, which may be information regarding articles or goods, coupons, advertisements, or access points.

For example, when the specified service zone is a hotel, the local server may make a database of various types of service information provided in the hotel, and store the database (such as area information around the hotel, room service information, restaurant information located in the hotel).

The access point 220 is a wireless communication device allowing the terminal to access the local server. In the present exemplary embodiment, for example, the terminal is connected to the local server by using a Wi-Fi wireless access scheme, but the present invention is not meant to be limited thereto. For example, the terminal may access the local server through various communication schemes such as Bluetooth, NFC, a mobile communication network, an RFID scheme, and the like.

The external server 230 refers to a server that makes a database of location information of the specialized service zone and stores the same. The external server is generally located at an outer side of the specialized service zone to which the terminal is currently connected, but it may be located within the specialized service zone. In particular, when the terminal is located at an outer side of the specialized service zone, it may measure the location of a specialized service zone which is nearest from the current location of the terminal and transmit the measured location information through the GPS receiver to the external server, so that it can receive the location information of the specified service zone from the external server. In this case, in order to access the external server, the terminal may use various communication schemes such as a mobile communication network, and the like.

Figure 3:
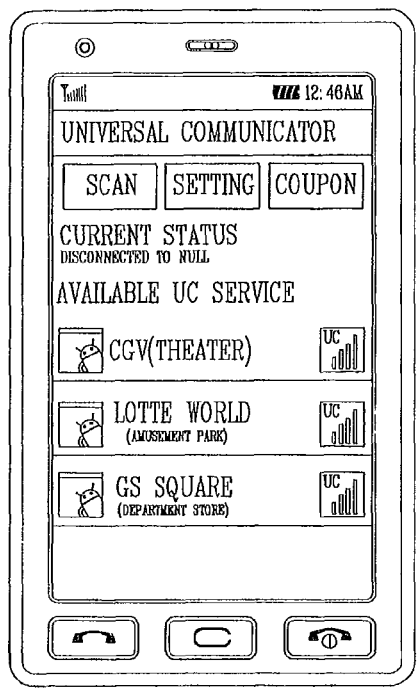
FIG. 3 is an overview of a display screen illustrating the function of displaying service information provided in a service zone according to an exemplary embodiment of the present invention.

FIG. 3 is an overview of a display screen illustrating the function of displaying service information corresponding to a service zone by using a camera according to an exemplary embodiment of the present invention.

With reference to FIG. 3, when the terminal enters the service zone, it receives service information corresponding to the service zone via the wireless communication unit.

In order to show only service information related to the location of the user among the received service information, only the service information corresponding to an image illuminated by the camera may be displayed.

In this case, the controller 180 may provide control to extract service information corresponding to the image captured by the camera among the service information corresponding to the service zone received via the wireless communication unit. Here, the service information corresponding to the captured image can be extracted in various manners.

First, for example, the location information of the camera at a point in time when the image is captured by using the camera may be used.

The location information in this case may be information including one or more of the position, direction, distance, and altitude of the camera. The position of the camera may be measured by the GPS receiver provided in the terminal. Also, the direction, distance or altitude may be measured by a sensor unit included by the terminal. Here, in order to obtain accurate camera location information, data corresponding to the location information may be combined to measure the location information.

The sensor unit may include one or more of an optical sensor, a geomagnetic sensor, a gyro sensor, an acceleration sensor, an altitude sensor, and a gravity sensor. Namely, the relative location information regarding the direction, altitude, distance, and the like, of the camera may be obtained through the sensors. For example, the direction of the camera may be measured by using the acceleration sensor measuring the movement of the terminal, the geomagnetic sensor measuring the azimuth angle, the gyro sensor measuring the angular velocity of the terminal, and the like. Here, the geomagnetic sensor may combine the location data and the azimuth angle data received from the GSP to provide an elaborate location-based service, as well as indicating the azimuth angle.

Also, the altitude of the camera may be measured by using a slope angle sensor, an altitude sensor, or a gravity sensor.

For example, the location information of the camera at a point in time when an image is captured by the camera may be measured by using the GPS receiver and the geomagnetic sensor. Service information corresponding to the image captured by the camera may be extracted by using the measured location information. Namely, the measured location information is compared with the map information stored in the storage unit, and when they are identical, the corresponding service information is extracted.

Here, the map information includes location information of the service information corresponding to the service zone. Namely, the map information may be information including one or more of the location, image, direction, distance, identification code, and altitude of the service information corresponding to the service zone.

Also, the map information may be information pre-stored in the storage unit or provided from the server in the service zone. When the map information is provided from the server, the map information may be received together when the service information corresponding to the service zone is received, after the terminal enters the service zone.

In another example, in order to extract the service information corresponding to the image captured by the camera, the controller may control the wireless communication unit to transmit the captured image to the server in the service zone at the point in time when the image is being captured by the camera. As described above, the server includes location information of the service information corresponding to the service zone. When the location information of the image transmitted from the server is received, it is compared with the map information stored in the storage unit. When the location information is identical to the map information according to the comparison result, corresponding service information, namely, service information corresponding to the image captured by the camera is extracted.

In another example, in order to extract the service information corresponding to the image captured by the camera, the controller may use an image or an identification code at the point in time when the image is being captured by the camera. Namely, the image or the identification code existing in the image captured by the camera is extracted, and when the image or the identification code included in the map information stored in the storage unit is identical, the service information corresponding to the image captured by the camera may be extracted.

In another example, the controller may use a signal strength at the point in time when the image is being captured by the camera. In this case, accurate service information regarding a user desired area can be displayed by using location information along with the signal strength. Namely, the controller may control the display unit to display only service information having a certain strength or higher based on the measured location information, thus the controller may control the display unit to display only the user desired service information.

Also, the signal strength may be measured through an access point installed in the service zone and the signal strength may differ depending on various factors such as the distance, altitude, direction, and the like.

Also, the controller may provide control to extract customized service information regarding the service information corresponding to the image captured by the camera and display the extracted customized service on the service information corresponding to the captured image in an overlapped manner. Here, the customized service information refers to detailed service information pre-stored in the terminal or received from a server managed in the service zone.

For example, the customized service information may be coupon information regarding the corresponding service information. In this case, the customized service information may include a term of validity of the coupon, a discount rate, a discounted item, and the like.

Or, the customized service information may be recommendation information. In this case, the customized service information may include a recommendation writing written by those who have used the corresponding service, the number of people who have used the corresponding service so far, the number of people who currently use the service, and the like.

Also, the customized service information may be advertisement information. In this case, when the image illuminated by the camera is a clothes shop, it may include information regarding new arrivals, information regarding a current event item, and the like.

Besides, the customized service information may include any information that may provide convenience to the user.

Also, the customized service information may be discriminated according to types and displayed at a portion of the display unit. Namely, the customized service information may be classified by advertisement information, coupon information, and the like.

Figure 4:
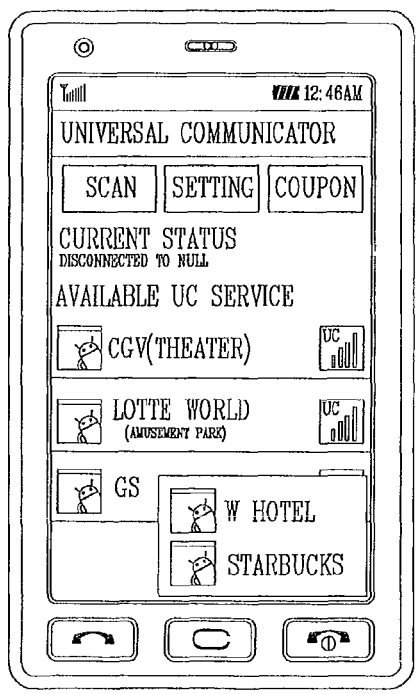
FIG. 4 is an overview of a display screen illustrating a function of displaying service information provided in a service zone according to another exemplary embodiment of the present invention.

FIG. 4 is an overview of a display screen illustrating a function of displaying service information provided in a service zone according to another exemplary embodiment of the present invention.

The controller may control the display unit to display service information corresponding to an image captured by the camera and service information other than the captured image separately on a main screen and an ambient screen. Namely, the service information corresponding to the captured image may be displayed to be large on the main screen, and other service information may be displayed to be small by reducing the size on the ambient screen. In this case, the information displayed on the main screen and the information displayed on the ambient screen may be interchanged to be displayed.

Also, the service information corresponding to an area that a portion of the terminal points to and service information corresponding to the other areas may be separately displayed on the main screen and the ambient screen as described above.

Figure 5:
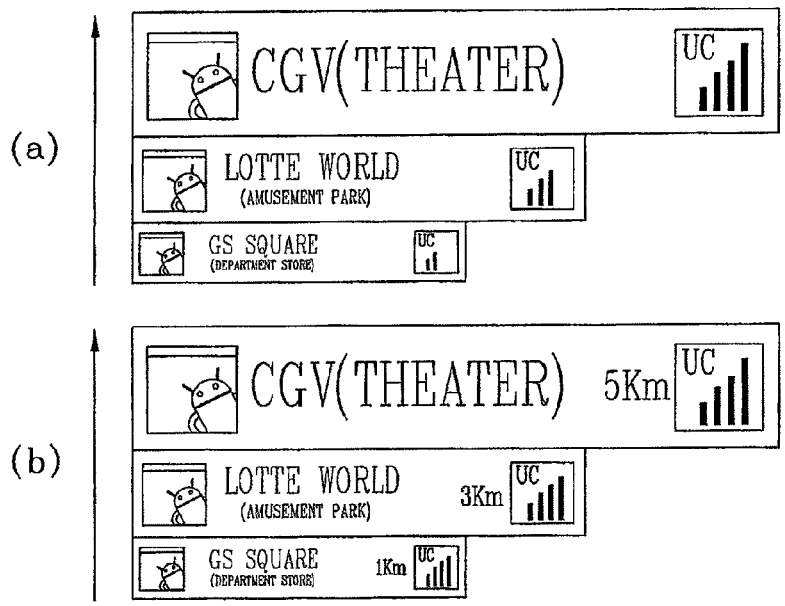
FIG. 5a is a view illustrating a function of displaying service information provided in a service zone according to a signal strength according to an exemplary embodiment of the present invention.
FIG. 5b is a view illustrating a function of displaying service information provided in a service zone according to a distance according to an exemplary embodiment of the present invention.

FIG. 5 shows the function of displaying the service information provided in the service zone according to another exemplary embodiment of the present invention.

In particular, FIG. 5a is a view illustrating a function of displaying service information provided in a service zone according to a signal strength according to an exemplary embodiment of the present invention, and FIG. 5b is a view illustrating a function of displaying service information provided in a service zone according to a distance according to an exemplary embodiment of the present invention.

The controller may control the display unit to display service information and the detailed service information of the service information by changing the size according to the distance and signal strength of the corresponding service information. As shown in FIG. 5, service information may be displayed in order starting from one having the highest signal strength and distance.

Figure 6:
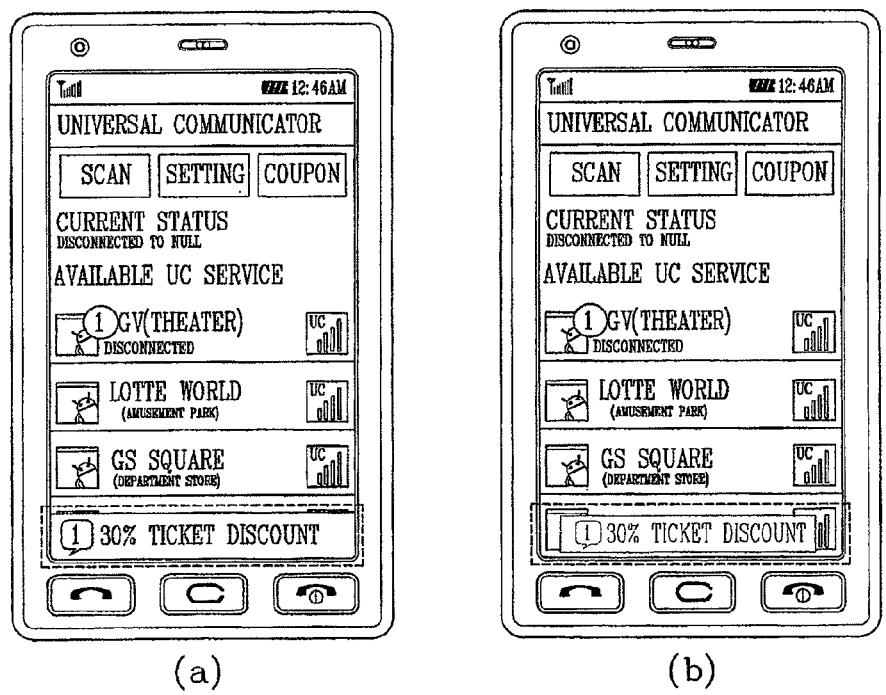
FIG. 6a is an overview of a display screen illustrating a function of displaying detailed service information of service information according to another exemplary embodiment of the present invention.
FIG. 6b is an overview of a display screen illustrating a function of making the detailed service information of FIG. 6a disappear.

FIG. 6a is an overview of a display screen illustrating a function of displaying detailed service information of service information according to another exemplary embodiment of the present invention, and FIG. 6b is an overview of a display screen illustrating a function of making the detailed service information of FIG. 6a disappear.

The controller may provide control to extract the customized service information of service information corresponding to the captured image and display the extracted customized service information. In this case, the controller may provide control to display the customized service information on the service information corresponding to the captured image in an overlapped manner.

The customized service information may be displayed only for a duration set by the user. Namely, the customized service information is displayed only for the pre-set duration, and when the pre-set duration lapses, the customized service information disappears. In this case, the pre-set duration may be changed by a value set by the user. Also, it may be set such that, after the particular time interval of the pre-set duration, the definition of the detailed service information is blurred or the size of the detailed service information may be reduced with the lapse of time, thus making the detailed service information disappear after the lapse of the pre-set time.

Also, the controller may provide control to display the customized service information to be mapped with the service information corresponding to the captured image.

Figure 7:
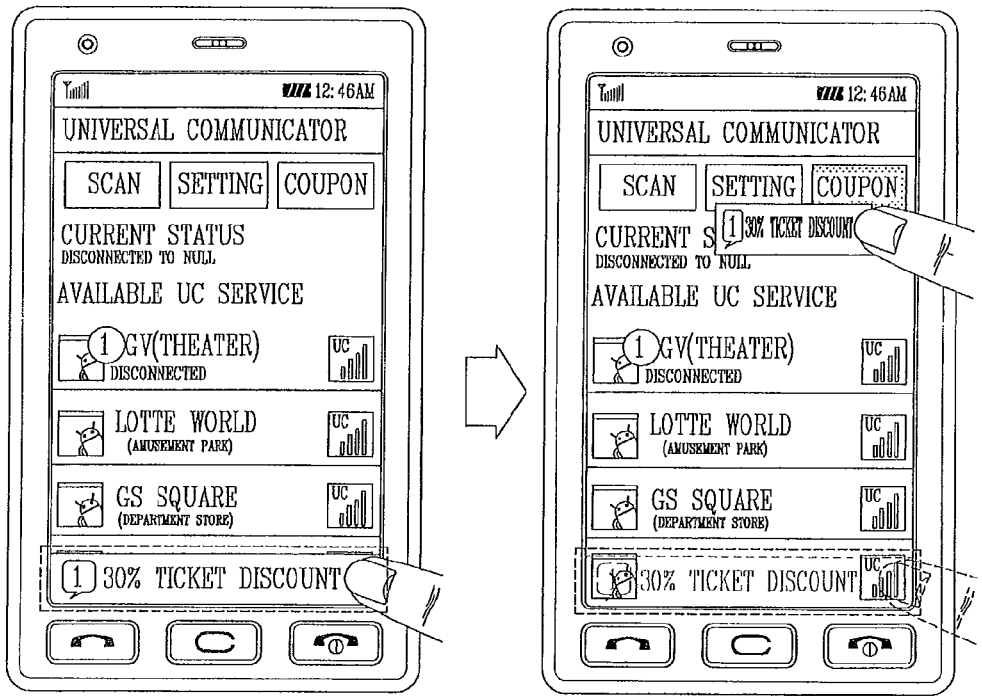
FIG. 7 is an overview of a display screen illustrating a function of transmitting detailed service information of service information to an area related to the corresponding service information according to another exemplary embodiment of the present invention.

FIG. 7 is an overview of a display screen illustrating a function of transmitting detailed service information of service information to an area related to the corresponding service information according to another exemplary embodiment of the present invention.

When the detailed service information is stored and one of the detailed service information is selected according to a user request, the controller may provide control to transmit the selected detailed service information. Here, the controller may provide control to update the storage unit by reflecting the transmission results.

Figure 8:
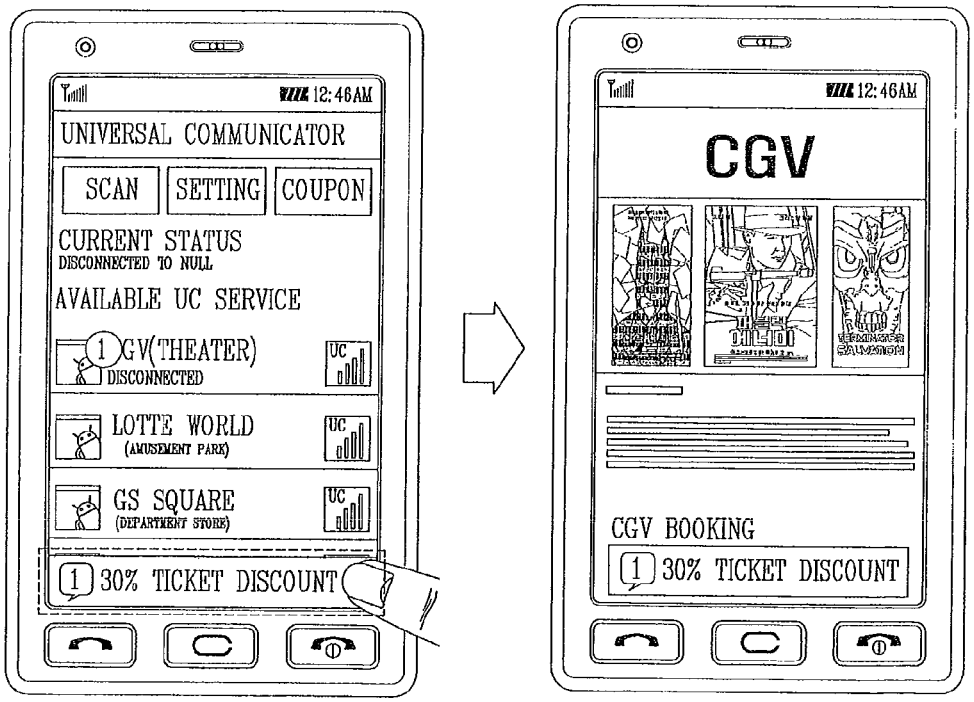
FIG. 8 is an overview of a display screen illustrating a function of storing the detailed service information of the service information according to another exemplary embodiment of the present invention.

FIG. 8 is an overview of a display screen illustrating a function of storing the detailed service information of the service information according to another exemplary embodiment of the present invention.

When the detailed service information is provided in the service zone and one of the detailed service information is selected according to a user request, the controller stores the selected service information. Here, the controller may provide control to update the storage unit by reflecting the storage results.

Figure 9:
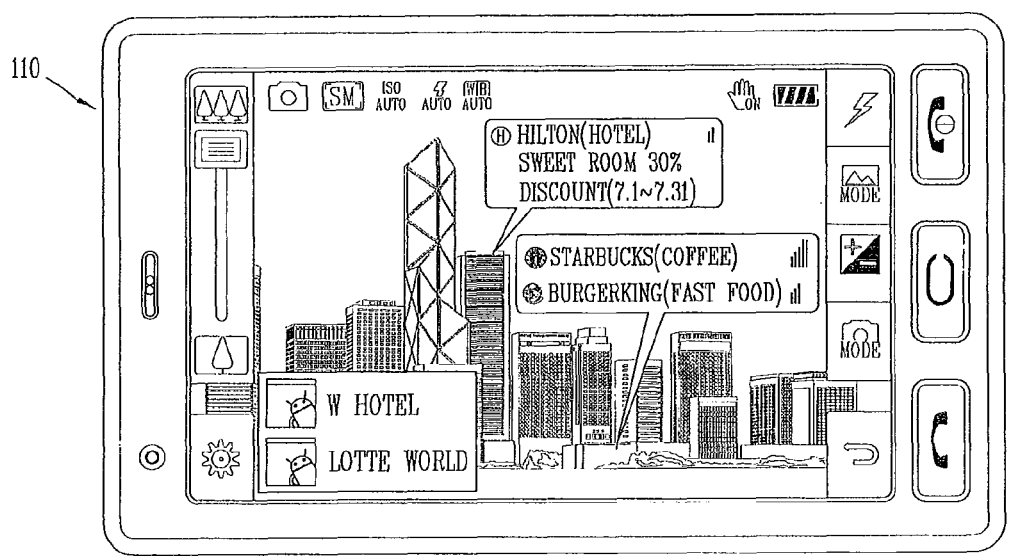
FIG. 9 is an overview of a display screen illustrating a function of displaying service information on an image illuminated by a camera according to another exemplary embodiment of the present invention.

FIG. 9 is an overview of a display screen illustrating a function of displaying service information on an image illuminated by a camera according to another exemplary embodiment of the present invention.

As shown in FIG. 9, the controller extracts service information corresponding to an image captured by the camera from the service information corresponding to the service zone. The controller may provide control to display the extracted service information on the service information corresponding to the captured image in an overlapped manner. Also, the controller may provide control to extract the customized service information, namely, the detailed service information, and display the customized service information to be mapped with the service information corresponding to the captured image.

Here, the customized service information may be previously stored in the terminal or may be detailed service information provided from the service corresponding to the service zone. For example, the customized service information may be coupon information regarding the corresponding service information. In this case, the customized service information may be coupon information regarding the corresponding service information. In this case, the customized service information may include a term of validity of the coupon, a discount rate, a discounted item, and the like.

Or, the customized service information may be recommendation information. In this case, the customized service information may include a recommendation writing written by those who have used the corresponding service, the number of people who have used the corresponding service so far, the number of people who currently use the service, and the like.

Also, the customized service information may be advertisement information. In this case, when the image illuminated by the camera is a clothes shop, it may include information regarding new arrivals, information regarding a current event item, and the like.

Besides, the customized service information may include any information that may provide convenience to the user.

Also, the customized service information may be discriminated according to types and displayed at a portion of the display unit. Namely, the customized service information may be classified by advertisement information, coupon information, and the like.

Figure 10:
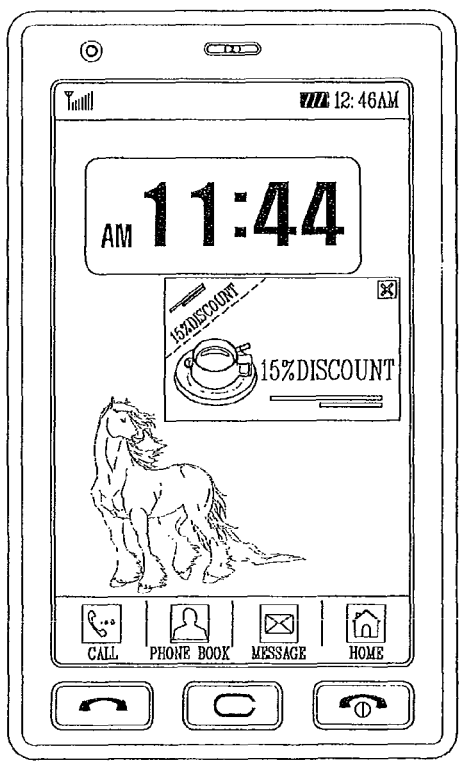
FIG. 10 is an overview of a display screen illustrating a function of displaying detailed service information of service information provided in a service zone according to another exemplary embodiment of the present invention.

FIG. 10 is an overview of a display screen illustrating a function of displaying detailed service information of service information provided in a service zone according to another exemplary embodiment of the present invention.

As shown in FIG. 10, when driven as a background, the customized service information, namely, the detailed service information of the service information, may be displayed in the form of a widget on a background image, rather than displaying an application program related to the service zone on the display unit.

Figure 11:
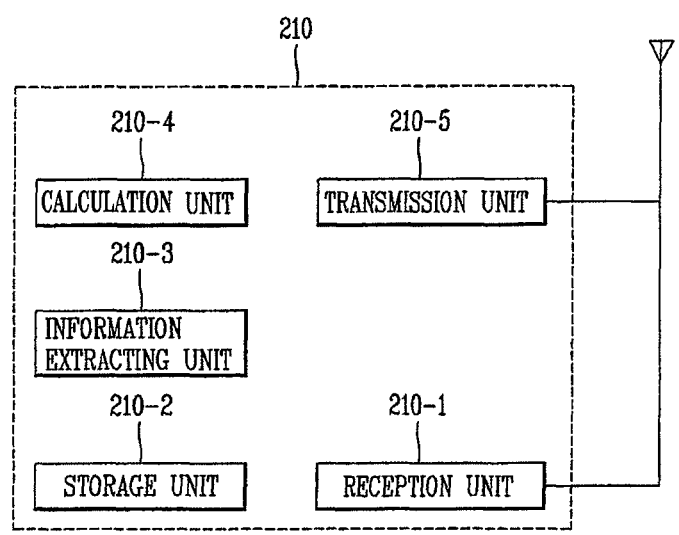
FIG. 11 is an internal block diagram of a server according to another exemplary embodiment of the present invention.

FIG. 11 is an internal block diagram of a server according to another exemplary embodiment of the present invention.

The server 210 may be configured to include a reception unit 210-1, a storage unit 210-2, an information extraction unit 210-3, a calculation unit 210-4, and a transmission unit 210-5.

First, the reception unit 210-1 receives image information captured by the camera included by the terminal. The image information may be various information such as an image captured by the camera, an identification code, a service name, and the like.

The storage unit 210-2 may store service information corresponding to a service zone and detailed service information of the service information. Here, the detailed service information may be coupon information. In this case, the detailed service information may include a term of validity of the coupon, a discount rate, a discounted item, and the like. Also, the detailed service information may be recommendation information. In this case, the detailed service information may include a recommendation writing written by those who have used the corresponding service, the number of people who have used the corresponding service so far, the number of people who currently use the service, and the like.

Also, the detailed service information may be advertisement information. In this case, when the image illuminated by the camera is a clothes shop, it may include information regarding new arrivals, information regarding a current event item, and the like.

Besides, the detailed service information may include any information that may provide convenience to the user.

The storage unit includes map information representing a place in which the service information corresponding to the service zone is used. The map information may include one or more of a location, an image, a direction, a distance, an altitude, and an identification code of the place where the service information corresponding to the service zone is used.

The information extraction unit 210-3 extracts service information corresponding to the captured image information among the stored service information from the storage unit. The information extraction unit extracts the location information based on the map information stored in the storage unit. Namely, the information extraction unit compares image information received from the terminal and the map information, and when the both information are identical, the information extraction unit extracts the location information regarding the image information.

The calculation unit 210-4 extracts detailed service information of the service information corresponding to the image information received from the terminal from the storage unit. After the extraction, the calculation unit calculates a location of the detailed service information to be displayed on the image captured by the camera based on the measured location information.

The transmission unit 210-5 transmits the extracted location information and the location information calculated by the calculation unit to the terminal.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

The invention claimed is:

1. A terminal device comprising:
a camera configured to capture an image via a lens;
a wireless communication unit configured to receive service information corresponding to a service zone in the service zone;
a controller configured to detect whether the terminal device has entered the service zone, and extract service information corresponding to the image captured by the camera among the received service information if the terminal device has entered the service zone; and a display unit configured to visually display the extracted service information under the control of the controller, wherein when an execution screen of an application program related to the service zone is displayed on the display unit, the display unit displays the service information corresponding the captured image on a main region thereof while displaying other service information corresponding to a part other than the captured image on a sub-region thereof, and wherein when a background screen is displayed on the display unit and the application program related to the service zone is driven in the background, the display unit is configured to display an execution window including the service information on the background screen, the execution window overlapping at least one portion of the background screen.

2. The terminal device of claim 1, further comprising:
a storage unit,
wherein the storage unit comprises map information representing a place in which the received service information is used, and the map information is pre-stored in the storage unit or received from a server managed in the service zone.

3. The terminal device of claim 2, wherein the map information comprises at least one of a location, an image, a direction, a distance, an altitude and an identification code of the place.

4. The terminal device of claim 1, wherein the controller extracts the service information corresponding to the captured image by using at least one of a location, a direction, a distance and an altitude of the camera when the image is captured.

5. The terminal device of claim 1, wherein the controller extracts the service information corresponding to the captured image by using an image or an identification code of the captured image.

6. The terminal device of claim 1, wherein the controller controls the wireless communication unit to transmit the captured image to a server in the service zone when the image is captured, and extracts the service information corresponding to the captured image by using the location information of the captured image received from the server.

7. The terminal device of claim 1, wherein the controller controls the display unit to display the extracted service information on the captured image in an overlapped manner.

8. The terminal device of claim 1, wherein the service information displayed in the execution window includes customized service information of the service information corresponding to the captured image.

9. The terminal device of claim 8, wherein the customized service information is detailed service information which is pre-stored or received from a server in the service zone.

10. The terminal device of claim 1, wherein the service zone is an area in which the terminal device can access a server managed in a predetermined area, and the server stores service information and location information of the service information specialized at the predetermined area and provides the stored information to terminals connected to the server.

11. The terminal device of claim 9, wherein the detailed service information is at least one of recommendation information, coupon information, advertisement information, and usage status information.

12. The terminal device of claim 9, wherein when one of the detailed service information is selected by a user request, the controller controls the wireless communication unit to transmit the selected detailed service information.

13. The terminal device of claim 9, wherein when one of the detailed service information is selected by a user request, the controller controls the storage unit to store the selected detailed service information.

14. The terminal device of claim 8, wherein the controller controls the display unit to stop displaying the customized service information when a pre-set time lapses.

15. The terminal device of claim 1, wherein the controller controls the display unit to display the extracted service information and customized service information of the extracted service information correspondingly according to a movement of the image.

* * * * *